United States Patent [19]

Martin

[11] Patent Number: 4,479,608

[45] Date of Patent: Oct. 30, 1984

[54] MANURE SPREADER

[75] Inventor: Mervin G. Martin, Myerstown, Pa.

[73] Assignee: Hedlund Manufacturing Co., Inc., Boyceville, Wis.

[21] Appl. No.: 512,946

[22] Filed: Jul. 13, 1983

Related U.S. Application Data

[63] Continuation of Ser. No. 170,034, Jul. 18, 1980, abandoned.

[51] Int. Cl.³ .............................................. A01C 23/00
[52] U.S. Cl. ...................................... 239/7; 239/662; 239/666; 239/675; 239/689
[58] Field of Search ............... 239/650, 662, 666, 670, 239/675, 676, 677, 679, 680, 681, 684, 689, 7; 366/186, 603

[56] References Cited

U.S. PATENT DOCUMENTS

| | | |
|---|---|---|
| 76,529 | 4/1868 | Rush . |
| 365,519 | 6/1887 | Hotham . |
| 368,182 | 8/1887 | Birkholz . |
| 1,235,427 | 7/1917 | Bridewell et al. . |
| 1,691,563 | 11/1928 | Burger ................................. 239/675 |
| 2,240,720 | 5/1941 | Selhorst . |
| 2,489,801 | 11/1949 | Myott . |
| 2,518,802 | 8/1950 | Markel ................................ 239/680 |
| 2,614,849 | 10/1952 | Holben . |
| 2,657,831 | 11/1953 | Pierce . |
| 3,025,067 | 3/1962 | Raney et al. . |
| 3,028,999 | 4/1962 | Polzin et al. . |
| 3,037,780 | 6/1962 | Skromme et al. . |
| 3,084,942 | 4/1963 | Kucera ................................ 239/681 |
| 3,159,406 | 12/1964 | Morr et al. . |
| 3,171,658 | 3/1965 | Clark .................................. 239/666 |

(List continued on next page.)

FOREIGN PATENT DOCUMENTS

| | | |
|---|---|---|
| 54453 | 3/1912 | Austria ................................ 239/650 |
| 863776 | 2/1971 | Canada . |
| 975018 | 9/1975 | Canada ................................ 239/675 |
| 989895 | 5/1976 | Canada . |
| 1029408 | 4/1978 | Canada . |
| 37517 | 11/1886 | Fed. Rep. of Germany . |
| 976899 | 3/1951 | France ................................ 239/681 |
| 1306804 | 9/1962 | France . |
| 495229 | 7/1954 | Italy . |
| 108078 | 11/1963 | Netherlands ........................ 239/681 |
| 1017225 | 1/1966 | United Kingdom . |
| 1186844 | 4/1970 | United Kingdom . |
| 1391284 | 4/1975 | United Kingdom . |
| 2014835 | 9/1979 | United Kingdom . |

OTHER PUBLICATIONS

"Ram Spreaders", Farm Machine Products, Inc., Wales, Wisconsin, Jan. 25, 1982.
"Knight-'350 Soupersolid' Manure Spreader", Knight Manufacturing Corp., Broadhead, Wisconsin, 1/25/82.
"Flail and Liquid Spreaders", Hawkbilt Farm Equipment, Vinton, Iowa, 1/25/82.
"Gehl Manure Spreaders", Gehl Company, West Bend, Wisconsin, 10/23/80.
"Manure-Handling Equipment", John Deere Company, Oct. 23, 1980.
"Calumet Spreader Tanks", Form ST776, Oct. 23, 1980, Calumet Co., Algoma, Wisconsin.
"Box Spreaders", Sperry, New Holland, copyright 1980.

*Primary Examiner*—John J. Love
*Assistant Examiner*—Michael J. Forman
*Attorney, Agent, or Firm*—Jacobson and Johnson

[57] ABSTRACT

The manure spreader includes a V-shaped hollow body having a longitudinally positioned impeller rotatively carried near its bottom. The impeller blades are arranged in oppositely generated helices to urge the manure both from the rear of the body and from the front of the body toward an outlet gate which is positioned in the body intermediate its ends. A rotary spinner is carried outwardly of the body in position to receive the effluent from the gate and suitable drive mechanism is provided to rotate the spinner at many times the rotative speed of the impeller. The spinner and the impeller are rotated by a common drive and an adjustable deflector may be provided to easily vary the spray pattern from the spinner.

36 Claims, 7 Drawing Figures

U.S. PATENT DOCUMENTS

| | | | |
|---|---|---|---|
| 3,189,355 | 6/1965 | Swenson et al. | |
| 3,295,855 | 1/1967 | Sadler et al. | 239/681 |
| 3,322,429 | 5/1967 | Cervelli | 239/675 |
| 3,420,452 | 1/1969 | Vaughan | 239/670 |
| 3,443,763 | 5/1969 | Wolford | 239/689 |
| 3,510,066 | 5/1970 | Swenson | 239/675 |
| 3,526,344 | 9/1970 | Koning | |
| 3,550,865 | 12/1970 | MacKinnon | 239/670 |
| 3,559,894 | 2/1971 | Murray | 239/675 |
| 3,598,325 | 8/1971 | Van Der Lely | |
| 3,706,442 | 12/1972 | Peat | 366/603 |
| 3,765,526 | 10/1973 | Hubbard | |
| 3,768,737 | 10/1973 | Tobias | |
| 3,790,090 | 2/1974 | Lorenc et al. | 239/666 |
| 3,797,807 | 3/1974 | Behrens | 366/186 |
| 3,964,714 | 6/1976 | Crawford et al. | |
| 4,013,224 | 3/1977 | Carter | |
| 4,014,271 | 3/1977 | Rohlf et al. | |
| 4,069,982 | 1/1978 | Brackbill | |
| 4,082,227 | 4/1978 | McGrane et al. | |
| 4,117,920 | 10/1978 | Oury | |
| 4,187,988 | 2/1980 | Brackbill et al. | 239/679 |

MANURE SPREADER

This application is a continuation of U.S. patent application Ser. No. 170,034, filed July 18, 1980, now abandoned.

BACKGROUND OF THE INVENTION

The invention relates generally to a novel manure spreader, more particularly, is directed to a manure spreader including both a slow speed impeller and a high speed spinner positioned to receive a flow of manure from the impeller and to spray the manure outwardly in a desired spray pattern.

Many types of spreaders have been developed by prior workers in the field which are usually employed in and about farms to utilize the fertilizer value of manure from herds of farm animals, for example diary cattle, in an efficient and economical manner. The prior art manure spreaders have included flail type spreaders which are generally most commonly employed for use with solid manures. Other workers in the art have developed spray type spreaders which employ necessary tanks, hoses and accessory equipment to effectively distribute liquid manures. Such wet type manures usually must first be processed to add sufficient water to permit use with the spray equipment. Both flail type spreaders and spray type spreaders have been generally and widely utilized in the past and both types are quite common. However, certain operating difficulties and inefficiencies have arisen with the presently available spreading equipment due to the nature of the manures available for distribution. For example, spreaders designed for solid application, such as the flail type spreader, cannot readily be employed for use with liquid manures. Such types are particularly designed for use with solid manures and because of this, have limited storage capacity during period of application. Also, because of the load characteristics inherent when spreading solid type manures, the prior art type of flail type spreader had to be ruggedly constructed and all parts had to be designed of increased strength to handle the solid materials. Despite the increased structural strength capabilities built into the equipment, there has been evidence of considerable wear and breakage, such as bearing wear, chain breakage and mechanical damage to the operating parts due to the nature of the solid manures In the case of prior art liquid type spreaders, the presently available prior art types incorporate a tanklike vehicle which is suitable only for use in the application of liquid manures. Accordingly, such spray type spreaders were suitable for use only with waste materials that had previously been pretreated prior to introduction into the tank of the spreader vehicle in order to provide an effluent specifically designed for use with the specific spreader. So far as is known, except for a composite manure spreader recently previously designed by the present applicant, and fully described in a co-pending application Ser. No. 0165,615, no other presently available equipment is known which is capable of disbursing either liquid or semi-liquid type manures or combinations thereof in a single apparatus.

SUMMARY OF THE INVENTION

The present invention relates generally to a liquid and semi-liquid type manure spreader, and more particularly, is directed to a manure spreader incorporating a V-shaped body for holding the manure, an impeller positioned near the bottom of the body to direct the manure to an outlet gate and a high speed spinner receiving the effluent from the gate for spray distribution as the spreader is propelled.

The manure spreader of the present invention includes a wheeled, open tank into the top of which liquid and/or semi-liquid manures can be easily fed by using existing, readily available loading equipment. The body of the spreader is generally V-shaped in cross-sectional configuration and incorporates near the bottom thereof a heavy duty, internal, chopper-type auger or impeller. The impeller is longitudinally positioned near the apex of the V-shape of the body and has its blades formed to a helix, a rear portion of which helix is designed to propel manure from the rear of the tank to a medially positioned gate and a front portion of the helix is designed to propel manure from the front of the body toward the medially positioned gate.

A high speed spinner is affixed in rotary engagement exteriorly of the body in position to receive the effluent from the gate and to direct the effluent in a spray pattern over the field to be so treated. Preferably the spinner rotates at a rotative speed that is from ten to fifteen times the rotational speed of the impeller. The drive of the spinner is taken from the drive of the impeller whereby both devices are rotated in unison, in opposite directions and at proportional rates of speed. If desired, a hinged deflector can be employed in conjunction with the spinner to vary the spray pattern to suit the existing field conditions.

In the preferred embodiment, the spinner is provided with a plurality of staggered blades whereby only a small proportionate number of the blades will be in contact with manure at any given instance. In this manner, the staggering of the blade pattern results in a device that is capable of operation at greatly reduced horsepower requirements. The spinner blades are preferably forwardly curved to provide a better manure throwing pattern.

It is therefore an object of the present invention to provide an improved manure spreader of the type set forth.

It is another object of the present invention to provide a novel manure spreader which includes an open, V-shaped body with a longitudinally aligned, double directional impeller positioned near the bottom of the body.

It is another object of the present invention to provide a novel manure spreader featuring an open body with side outlet and an impeller suitable to move liquid and semi-liquid material from both the front of the body and from the rear of the body, through the outlet to a spinner for spreading purposes.

It is another object of the present invention to provide a novel manure spreader including an open body equipped with an auger having chopper type blades, some of the blades being arranged in a forwardly directed helix and other of the blades being arranged in a rearwardly directly helix, the body having a side opening wherein the auger directs the material from the body at the side opening, a spinner positioned at the side opening for spraying the manure and a drive mechanism arranged to rotate the spinner at many times the rotational speed of the auger.

It is another object of the present invention to provide a novel manure spreader including a generally V-shaped body, a dual directional impeller longitudinally arranged interiorly of the body, a spinner rotatively carried outside of the body in position to receive the effluent from the impeller intermediate the ends of the body and means to rotate the spinner at many times the rotative speed of the impeller.

It is another object of the present invention to provide a novel manure spreader comprising an open, generally V-shaped body, an impeller longitudinally arranged for rotation near the bottom of the body for manure directional purposes, a spinner receiving the effluent from the impeller and being rotatively positioned exteriorly of the body, a drive means rotating the impeller and the spinner, the drive means including means to rotate the spinner at from ten to fifteen times the rotational speed of the impeller and means to vary the spray pattern of the effluent from the spinner.

It is another object of the present invention to provide a novel liquid and semi-liquid manure spreader that is simple in construction, rugged in design and trouble-free when in operation.

Other objects and a fuller understanding of the invention will be had by referring to the following description and claims of preferred embodiment thereof, taken in conjunction with the accompanying drawing, wherein like reference characters refer to similar parts throughout the several views and in which:

DESCRIPTION OF THE PREFERRED EMBODIMENTS OF THE INVENTION

Although specific terms are used in the following description for the sake of clarity, these terms are intended to refer only to the particular structure of the invention selected for illustration in the drawings, and are not intended to define or limit the scope of the invention.

Figure 1:
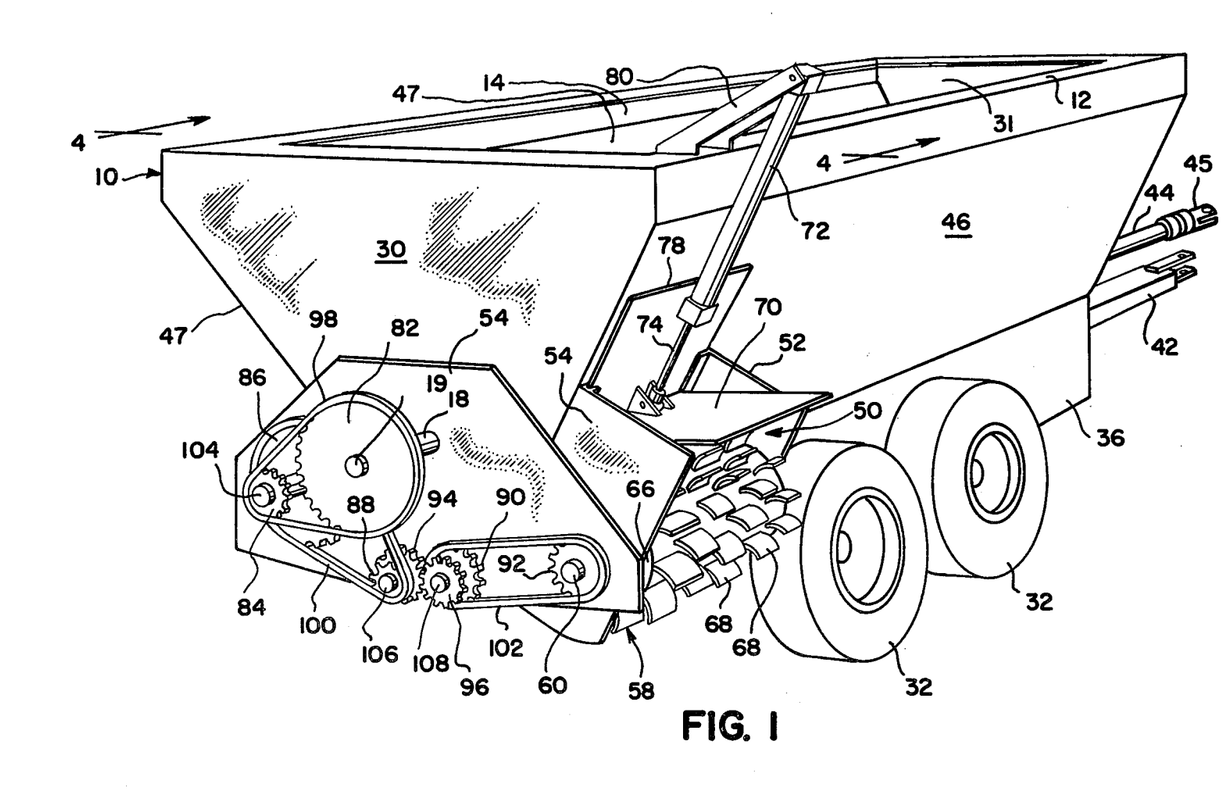
FIG. 1 is a rear perspective view showing the manure spreader of the present invention.
Figure 2:
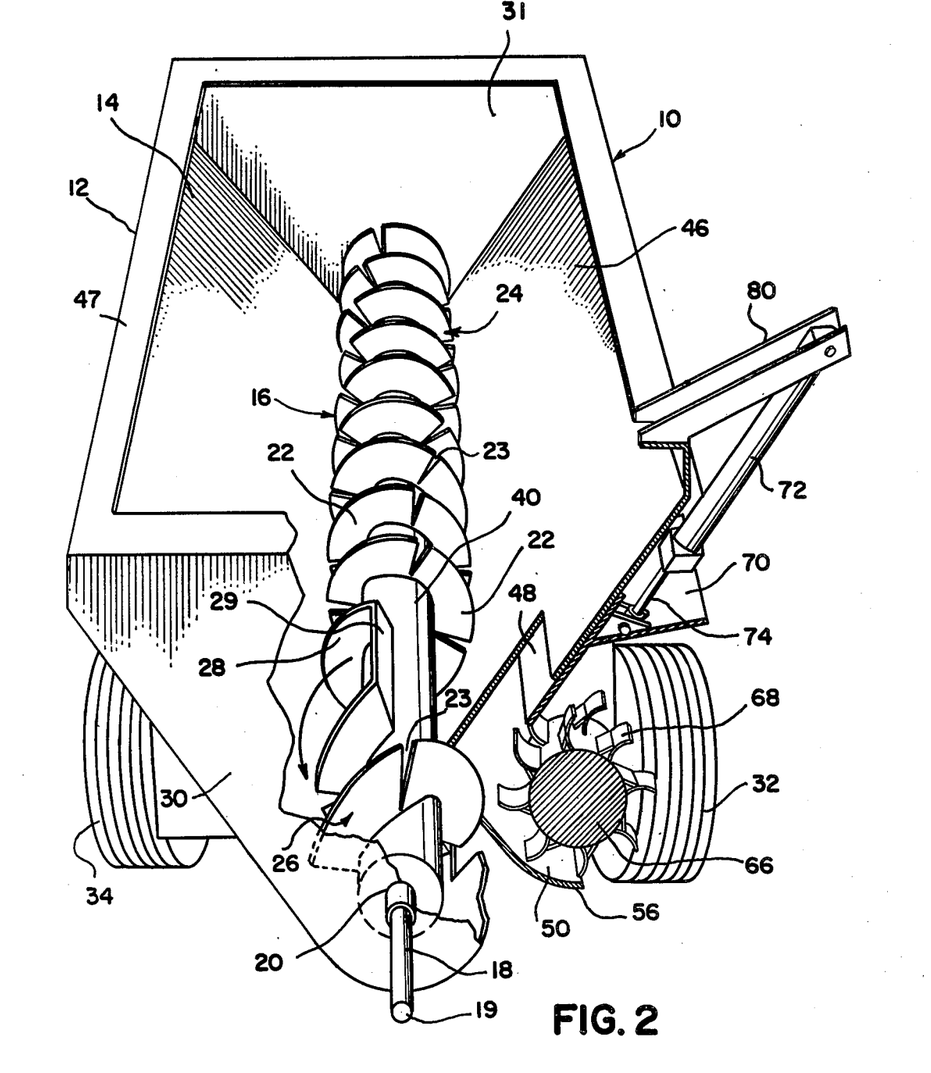
FIG. 2 is a top perspective view of the manure spreader, partially broken away to disclose interior construction details.

Referring now to the drawings, there is shown in FIGS. 1 and 2 a manure spreader generally designated 10 which comprises essentially a wheeled, tank type body 12 having an open top 14 into which the manure (not shown) to be spread can be readily dumped. The body 12 is generally V-shaped in configuration and is carried upon a suitable, sturdy chassis 36 in a conventional manner. The chassis 36 is arranged for easy transport over the field to be treated by employing a plurality of right and left wheels 32, 34 mounted in pairs upon conventional axles 38 in well known manner.

The manure spreader 10 is conventionally transported and powered by a tractor or other farm equipment (not shown) in well known manner. For example, a hitch 42 is illustrated in FIG. 1 for usual towing connection to the piece of farm equipment. Power for operation of the device is also conventionally drawn from the tractor or other farm equipment through a rotating drive shaft 44 which is supplied with a suitable coupling 45 for connection to the tractor drive (not shown) in usual manner.

Figures 3, 6, 7:
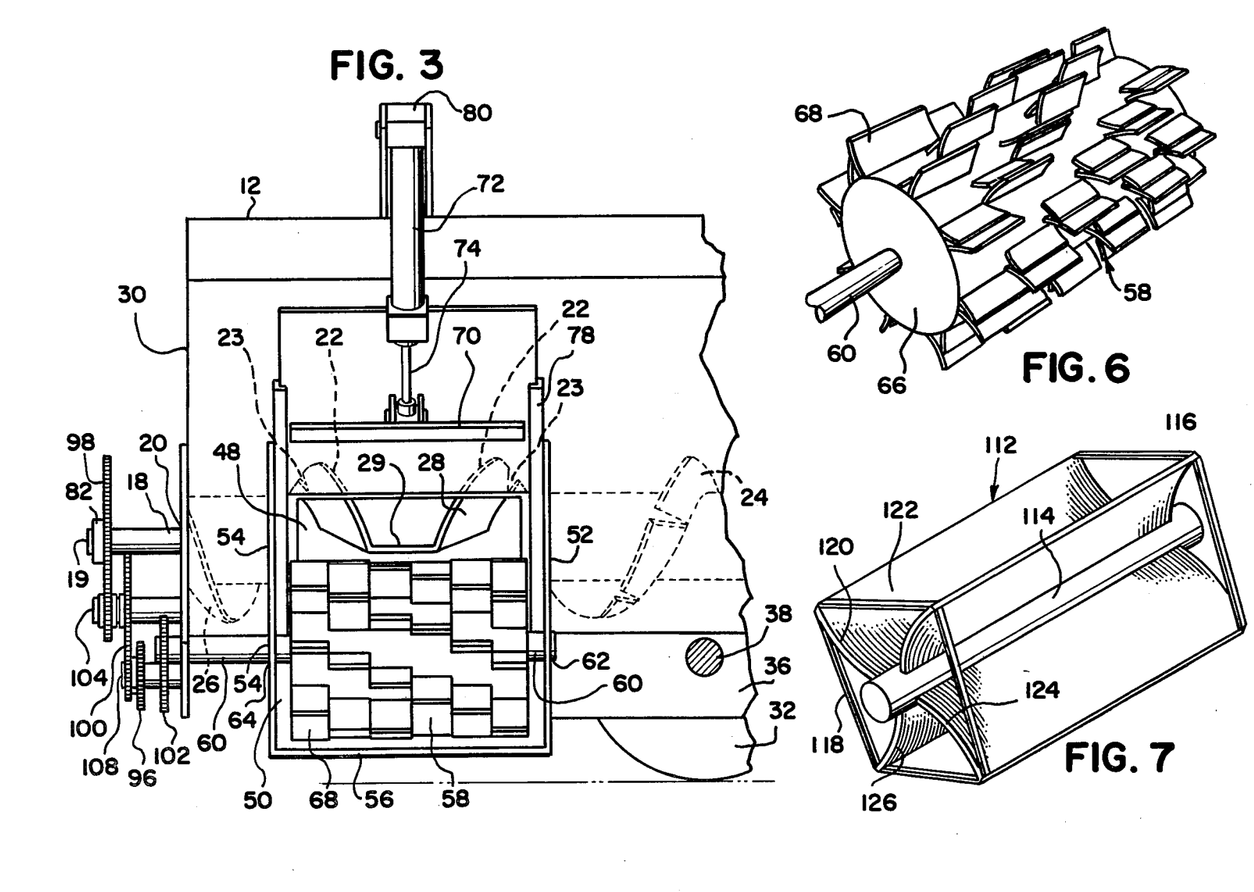
FIG. 3 is a partial, enlarged, side elevational view showing the spinner, and with portions of the impeller illustrated in phantom lines.
FIG. 6 is a detailed, enlarged, perspective view of the spinner of the present invention.
FIG. 7 is a detailed, enlarged, perspective view of a modified spinner.
Figure 4:
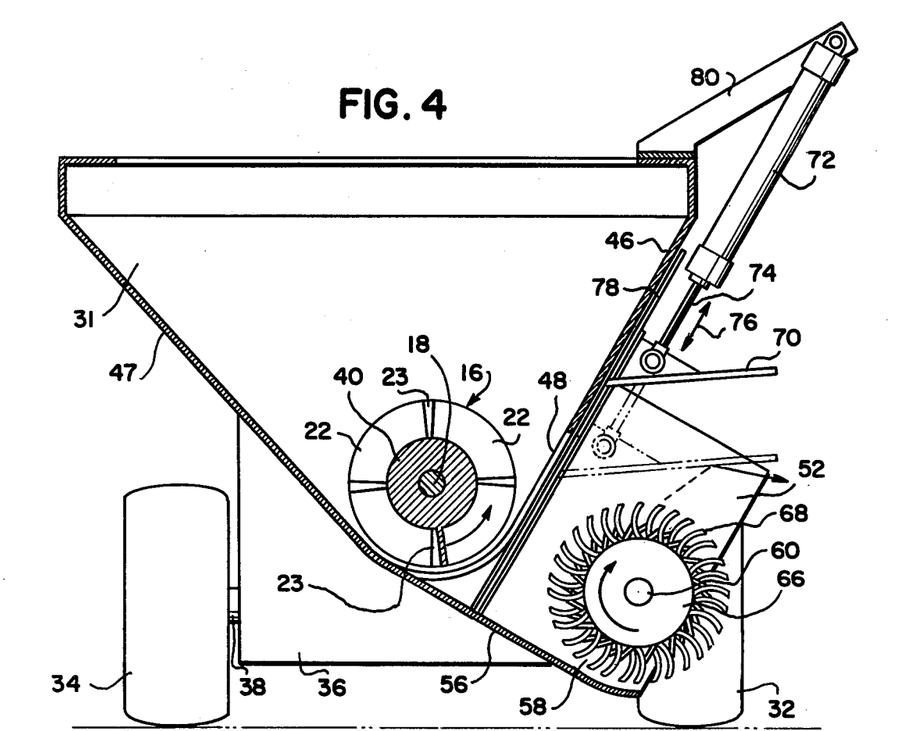
FIG. 4 is an enlarged, cross sectional view taken along line 4—4 on FIG. 1, looking in the direction of the arrows.

As best seen in FIGS. 2, 3 and 4, an impeller 16 is longitudinally positioned within the interior of the body 12 near the bottom of the V-configuration. The impeller 16 extends the entire length of the body 12 and forwardly has its shaft 18 coupled to the drive shaft 44 in known manner whereby rotation of the drive shaft 44 by the tractor (not shown) will cause corresponding rotation of the impeller 16. The impeller shaft 18 is journalled within conventional forward and rearward bearings 20 (only the rear bearing being shown) for rotation relative to the body 12. The impeller shaft 18 extends rearwardly in a shaft extension 19 for powering the manure spreader system as hereinafter more fully set forth.

Still referring to FIGS. 2–4, it will be observed that the impeller 16 includes an elongated, cylindrical body 40 which is concentric with and which is secured to the impeller shaft 18 in conventional, sturdy manner, such as by welding or other interconnection. A plurality of individual blades 22, which are defined one from another by radially extending openings 23, are welded or otherwise secured to the impeller body 40 in the configuration of a helix for manure directing purposes. The helix is divided into a rearwardly directed helix 24 which acts to urge manure (not shown) contained within the body 12 rearwardly within the body from the front wall 31 to the side outlet 48. The helix is also formed to provide a forwardly directed helix 26 which serves to urge the manure forwardly within the body from the rear wall 30 toward the side opening or gate 48. The rearwardly directed helix 24 terminates at the forward end of the unloading section 28. Similarly, the forwardly directed helix 26 terminates forwardly in the rearward end of the unloading section 28. Accordingly, the dual directed helix 24 tends to urge the liquid and semiliquid manure contained within the body 12, both from the front wall 31 and the rear wall 30 toward the unloading section 28. As illustrated, the unloading section 28 is positioned adjacent to the opening or gate 48 and is closer to the body rear wall 30 and further from the body front wall 31.

One of the body inclined sidewalls 46 or 47 is provided with a side opening or gate 48 to permit the manure (not shown) contained within the body 12 and driven by the impeller 16 to exit the body for manure spreading purposes. The gate or opening 48 tranversely aligns with the unloading section 28, for side unloading to the spinner 58. It is noteworthy that the unloading section 28 comprises a longitudinally aligned wall 29 which serves to urge or sweep the manure transversely through the gate 48 as the impeller 16 is rotated upon the application of rotative forces to the drive shaft 44.

Referring now to FIGS. 1, 2, 3 and 4, a spreader chamber 50 is welded or otherwise secured exteriorly of the body sidewall 46 or 47 and comprises generally a right wall 52, a left wall 54 and an interconnecting floor or base wall 56. A manure spreading spinner 58 is mounted for rotation between the right and left spreader chamber walls 52, 54 and can be journalled within respective front and rear bearings 62, 64 in a conventional manner. As illustrated in FIG. 4, the spreader chamber floor 56 forms a continuation of the spreader body inclined wall 47 so that manure delivered to the gate 48 through the interaction of the rearwardly directed helix 24, the forwardly directed helix 26 and the unloading section section 28 dumps or flows the manure directly from within the body 12 into the spreader chamber 50 for throwing or spreading by the spinner 58 as the spinner is rotated at high rotative speeds. If desired, a door (not shown) can be provided in known manner to close the opening 48 in the body wall 46 when the device 10 is not in use and to expose the opening 48 when it is desired to employ the spreader 10 for manure spreading purposes. It is an important feature of this invention to rotate the spinner 58 at speeds considerably in excess of the speed rotation of the auger or impeller 16 as hereinafter more fully set forth.

Referring now to FIGS. 3 and 6, it will be observed that the spinner 58 comprises a cylindrical body 66 which is concentric about the spinner shaft 60 and is secured thereto in known manner to form a fixed, permanent engagement. The periphery of the spinner body 66 is provided with a plurality of individual, curved blades 68 which project substantially radially outwardly from the periphery of the body 66 and then curve forwardly in the direction of rotation for optimum manure spreading or throwing pattern purposes. As illustrated, the blades 68 are arranged in staggered rows wherein each blade is peripherally offset from the next adjacent blade. By arranging the blades 68 in such staggered rows, horsepower requirements to rotate the spinner 58 can be drastically reduced inasmuch as smaller surface areas are rotatively urged into contact with the manure at any given point in the rotative cycle.

As above set forth, the spinner shaft 60 is journalled between the right and left bearings 62, 64 and is positioned to receive and to propel the manure (not illustrated) which is driven into the spreader chamber 50 upon rotation of the impeller 16. It is a feature of this invention to rotate the spinner 58 many times faster than the speed of rotation of the auger or impeller 16. By driving the auger at a relatively slow rate of speed, the manure loaded within the interior of the body 12 can be most advantageously directed to the opening or gate 48 without the stranding of solids upon the inclined body sidewalls 47, 48. The high speed rotation of the spinner 58 provides maximum efficiency in spreading or throwing the manure. Additionally, the construction comprising the opening or gate 48 combined with the slow speed of rotation of the impeller or auger 16 facilitates the handling of drier materials without stranding of the solids within the body prior to spilling into the spreader chamber 50. Due to this capability of handling a full range of materials from very wet to very dry, the manure spreader 10 of the present invention can be employed to handle a wider variety of materials to be spread in a troublefree and highly efficient manner. While the individual spreader blades 68 are illustrated as projecting substantially initially radially from the spinner body 66, experiments have shown that with certain materials, a slight forward lean of the blades 68 at their interconnection with the body 66 forwardly of the radial alignment can result in a better throwing pattern and more efficient manure spreading. Additionally, as illustrated, the blades 68 are forwardly curved to provide for a better and more efficient throwing pattern upon high speed rotation of the spreader 58.

Figure 5:
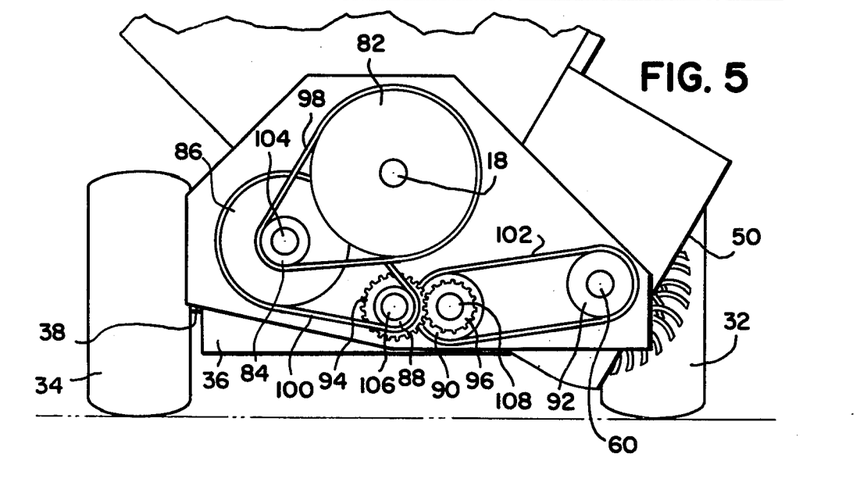
FIG. 5 is a partial, rear elevational view showing a preferred drive arrangement.

Referring now to the FIGS. 1 and 5, one embodiment of a spinner drive mechanism will now be described. As illustrated, the auger shaft 18 extends through the rear bearing 20 in a conventional shaft extension 19 to which is pinned or otherwise secured a large diameter sprocket 82. Accordingly, when the drive shaft 44 is connected to the tractor drive (not shown) through the coupling 45, rotation of the drive shaft 44 causes simultaneous rotation of the impeller shaft 18 and the shaft extension 19. As above set forth, it is preferable to rotate the impeller shaft 18 at a relatively slow speed and the spinner shaft 60 at a relatively high speed. The large diameter sprocket 82 drives a small diameter sprocket 84 through a conventional drive chain 98 to thereby cause higher speed rotation of the sprocket shaft 104. Pinned on the same shaft 104 is a large diameter sprocket 86 which is simultaneously turned upon rotation of the sprocket shaft 104. The large diameter sprocket 86 rotates a small diameter sprocket 88 through the chain drive 100 in a well known manner. Rotation of the small diameter sprocket 88 causes rotation of its affixed sprocket shaft 106 at a higher rate of speed, also in well known manner. Secured on the sprocket shaft 106 is a gear 94, which gear 94 is simultaneously rotated as the sprocket shaft 106 is rotated.

A corresponding gear 96 meshes with the gear 94 and is rotated thereby, but in opposite direction. Rotation of the gear 96 causes simultaneous rotation of the affixed shaft 108 in the same direction as the direction of rotation of the gear 96. Also pinned upon the shaft 108 is a sprocket 90 which is caused to rotate at high speed, the speed increases provided by the linkage of the large and small sprockets 82, 84, and 86, 88. The sprocket 90 is interconnected through the chain drive 102 with the spinner sprocket 92 to cause simultaneously rotation in the same direction. Rotation of the spinner sprocket 92 causes the affixed spinner shaft 60 to rotate within the right and left bearings 62, 64 at high speed to also rotate the affixed spinner 58.

Preferably, the auger or impeller 16 is rotated by the drive shaft 44 at a rotative speed of approximately fifty revolutions per minute. Simultaneously, through the speed up sprockets above enumerated, the spinner 58 is optimunly rotated at a speed of approximately five hundred and forty revolutions per minute to seven hundred and fifty revolutions per minute to provide an optimum spray pattern. In one satisfactory arrangement, the sprocket 82 was 17.1 inches in diameter, 54 teeth, 80 pitch; the cooperating small diameter sprocket 84 was 5 inches in diameter, 14 teeth, 80 pitch. The second large diameter sprocket 86 was 13.3 inches in diameter, 52 teeth, 60 pitch and the interconnected smaller diameter sprocket 88 was 4.7 inches in diameter, 18 teeth, 60 pitch. Both gears 94, 96 were 6 inches in diameter, 30 teeth and 5 pitch. The spinner driving sprockets 90, 92, were equal in size and both were 5 inches in diameter, 14 teeth, 80 pitch.

As illustrated in FIGS. 2, 3 and 4, in order to easily vary the spreader pattern, the spreader chamber 50 may be provided with an overhead deflector 70 which can be arranged for vertical or hinged adjustment relative to the spreader 58 in well known manner. In the embodiment illustrated, a hydraulic cylinder 72 is supported in pivotal manner from the body 12 through a stationary bracket 80 in a manner to reciprocally move the deflector 70 relative to the spinner 58. As best seen in FIG. 4, the cylinder 72 functions its piston rod 74 in the directions indicated by the arrow 76 to move the deflector 70 between the positions illustrated in full lines and phanton lines. In one embodiment, as illustrated, the deflector 70 may be provided with suitable guides 78 to facilitate the inclined, vertical movement indicated. If desired, the cylinder 72, piston arm 74 and the deflector 70 could also be arranged to pivot the deflector relative to the spinner 58. As above set forth, the purpose of the deflector 70 is to vary the spray pattern, and this variation may be accomplished in a desired, efficient manner.

Referring now to FIG. 7, a modified spinner 112 is illustrated comprising generally a shaft 114 which may be suitably journaled within the bearings 62, 64 in the same manner as the spinner shaft 60 previously described. A plurality of forwardly curved longitudinally extending blades 120, 122, 124, 126 extend in length between the right end plate 116 and the left end plate 118 and are secured thereto in sturdy manner, such as by welding. The modified spinner 112 is designed for high speed rotation, similar to the spinner 58 to develop a suitable manure spray pattern. It is contemplated that the modified spinner 112 will require more horsepower to rotate than the spinner 58 inasmuch as the blades 120, 122, 124, 126 present broad surfaces in contact with the product whereas the blades 68 of the spinner 58 are staggered to allow only a few of the blades to strike the manure at one time.

Although the invention has been described with a certain degree of particularity, it is understood that the present disclosure has been made only by way of example and that numerous changes in the details of construction and the combination and arrangement of parts may be resorted to without departing from the spirit and scope of the invention.

What is claimed is:

1. A manure spreader for spreading liquid or semi-liquid type manures containing solids comprising:
   a container having a top and a bottom and being defined by end walls and sidewalls for holding manure to be spread;
   an impeller means longitudinally positioned and arranged for rotation within said container,
   said impeller means comprising a plurality of blades positioned to form a helix to propel manure within said container,
   said impeller means being rotatively driven to rotate at a first, slow, rotative speed to prevent stranding of solids on said sidewalls, said impeller including means for discharging the manure away from said impeller means,
   an unloading section including an opening in said container to permit manure to exit from said container, said unloading section operable to receive the manure discharging away from said impeller means and to direct the manure to a position to be spread;
   spreader means positioned outwardly adjacent to said container to receive the manure from the opening in said unloading section and to spread the manure in a spray pattern,
   said spreader means comprising a chamber and a spinner having a manure blade with an outer edge for spreading and shreading manure, said spinner mounted on a nonvertical axis of rotation and being adapted for rotation at a second, fast, rotative speed;
   said unloading section including means for directing the manure to the outer edge of said manure blade so that said outer edge of said manure blade is operable to propel manure in the spray pattern; and
   drive means interconnected with said impeller means to rotate said impeller means at the first slow rotative speed and interconnected with said spinner to rotate said spinner at the second fast rotative speed.

2. The manure spreader of claim 1 wherein some of the blades of said impeller means are arranged to form a rearwardly directed helix and other of said blades of said impeller means are arranged to form a forwardly directed helix.

3. The manure spreader of claim 2 wherein said rearwardly directed helix terminates rearwardly at a location adjacent to said unloading section.

4. The manure spreader of claim 3 wherein said forwardly directed helix terminates forwardly at a location adjacent to said unloading section.

5. The manure spreader of claim 2 wherein said forwardly directed helix terminates forwardly at a location adjacent to said unloading section.

6. The manure spreader of claim 1 wherein said unloading section is positioned intermediate said end walls.

7. The manure spreader of claim 1 wherein said container sidewalls form a generally V-shaped cross sectional configuration and wherein said bottom of the container is located at the apex of the V-shape.

8. The manure spreader of claim 1 wherein the impeller means is positioned immediately above said bottom of said container.

9. The manure spreader of claim 1 wherein at least some of said plurality of blades are defined from other blades by openings therebetween.

10. The manure spreader of claim 9 wherein at least some of the openings are defined by radially extending lines.

11. The manure spreader of claim 1 wherein the second fast rotative speed is at least ten times faster than the first slow rotative speed.

12. The manure spreader of claim 1 wherein the second fast rotative speed is between ten and fifteen times greater than the first slow rotative speed.

13. The manure spreader of claim 1 wherein said impeller means comprises a longitudinally extending shaft and wherein said shaft forms a part of the drive means.

14. The manure spreader of claim 1 wherein said drive means comprises means to rotate said impeller means and said spinner in opposite directions.

15. The manure spreader of claim 1 wherein said unloading section comprises a wall, said wall being positioned in longitudinal, parallel alignment with the axis of said impeller means.

16. The manure spreader of claim 1 wherein said spinner comprises a shaft, a cylindrical body surrounding said shaft and a plurality of spinner blades extending outwardly from said shaft.

17. The manure spreader of claim 16 wherein at least some of said spinner blades are curved forwardly in the direction of rotation.

18. The manure spreader of claim 17 wherein at least some of said spinner blades are arranged in staggered alignment about the periphery of said shaft.

19. The manure spreader of claim 16 wherein at least some of said spinner blades project substantially radially outwardly from the periphery of said shaft.

20. The manure spreader of claim 19 wherein said spinner blades curve forwardly in the direction of rotation.

21. The manure spreader of claim 16 wherein at least some of said spinner blades are arranged in staggered alignment about the periphery of said shaft.

22. The manure spreader of claim 1 wherein said spinner comprises a shaft and a plurality of at least four spinner blades radially extending from said shaft, said blades being forwardly curved in the direction of rotation.

23. The manure spreader of claim 22 wherein said spinner blades terminate forwardly and rearwardly in enclosing end plates.

24. The manure spreader of claim 1 wherein said spreader means comprises deflector means, said deflector means being positioned to be contacted by the manure from said spinner to vary the spray pattern.

25. The manure spreader of claim 24 including adjustable means to move said deflector means relative to the spinner.

26. An apparatus for spreading liquid or semiliquid manures comprising:
  a container for holding manure to be spread;
  a spinner attached to said apparatus for spreading liquid or semi-liquid manures, said spinner having a plurality of blades having an outer peripheral edge for shredding and spreading manure;
  means located in said container for moving manure within said container to a position where the manure can be spread, said means operable for directing the manure onto said outer peripheral edge of said blades to thereby permit said blades to engage the manure flowing from said container; and
  drive means for rotating said spinner at sufficiently high velocity so that when manure is moved from in said container into said spinner said spinner is operable for lifting said manure upward for expelling the manure over said spinner to produce a spray pattern of manure on a field.

27. The invention of claim 26 wherein said spinner is mounted on a horizontal axis on a sidewall of said container and is adapted for rotation at sufficiently fast rotative speed to permit said blades to propel liquid or semi-liquid manure in a vertical spray pattern laterally of said container.

28. The invention of claim 26 wherein said container has a first inclined nonvertical sidewall and a second inclined nonvertical sidewall that converge toward each other, one of said inclined nonvertical sidewalls located at a steeper angle with respect to the horizon than the other, said inclined nonvertical sidewall located at a steeper angle with respect to the horizon having an opening for discharging manure.

29. The invention of claim 26 wherein said means located in said container for moving manure comprises an impeller.

30. The invention of claim 29 wherein said container has a general V shape cross sectional configuration.

31. The invention of claim 30 wherein said plurality of blades are curved forward in the direction of rotation of said spinner.

32. The invention of claim 31 including deflector means to vary the spray pattern.

33. The invention of claim 32 wherein at least some of said plurality of blades are located in staggered alignment on said spinner.

34. The invention of claim 32 wherein said impeller includes a plurality of blades located in a helix.

35. The invention of claim 34 including a chain drive to propel said spinner and said impeller.

36. An apparatus for spreading manures including liquid or semi-liquid type manures containing solids comprising:

- a container having a top and a bottom and being defined by end walls and sidewalls for holding manure to be spread;
- a helical impeller means longitudinally positioned and arranged for rotation within said container;
- said helical impeller means positioned to propel manure within said container;
- said helical impeller means being rotatively driven to rotate at a first, slow rotative speed to prevent stranding of solids on said sidewalls;
- an unloading section including an opening in said container to permit manure to exit from said container, said unloading section operable to receive the manure from said helical impeller means and to direct the manure to a position to be spread;
- spreader means positioned outwardly adjacent to said container to receive the manure from the opening in said unloading section and to spread the manure in a spray pattern;
- said spreader means comprising a chamber and a spinner having a manure blade with an outer edge for spreading and shreading manure, said spinner mounted on a nonvertical axis of rotation and being adapted for rotation at a second, fast rotative speed;
- said unloading section including means for directing the manure to the outer edge of said manure blade so that said outer edge of said manure blade is operable to propel manure in the spray pattern; and
- drive means interconnected with said impeller means to rotate said impeller means at the first slow rotative speed and interconnected with said spinner to rotate said spinner at the second fast rotative speed.

* * * * *